Jan. 6, 1970     J. T. KUMMER ET AL     3,488,271
METHOD FOR SEPARATING A METAL FROM A SALT THEREOF
Filed Dec. 2, 1966
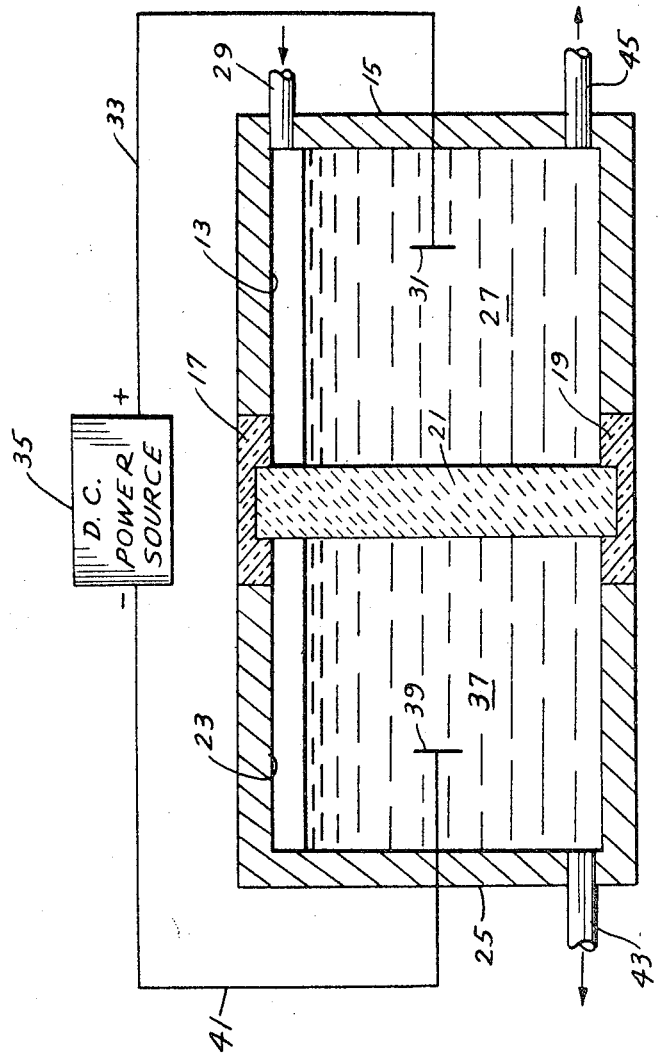
JOSEPH T. KUMMER
NEILL WEBER
INVENTORS
BY John R. Faulkner
Olin B. Johnson
ATTORNEYS

United States Patent Office 3,488,271
Patented Jan. 6, 1970

3,488,271
METHOD FOR SEPARATING A METAL FROM A SALT THEREOF
Joseph T. Kummer, Ann Arbor, and Neill Weber, Dearborn, Mich., assignors to Ford Motor Company, Dearborn, Mich., a corporation of Delaware
Continuation-in-part of application Ser. No. 563,938, May 2, 1966. This application Dec. 2, 1966, Ser. No. 598,803
Int. Cl. C22d *3/00;* B01k *1/00;* B01d *13/02*
U.S. Cl. 204—180                                  6 Claims

ABSTRACT OF THE DISCLOSURE

A metal is separated from its electrically dissociable molten salt by electrically attracting the cations through a solid electrolyte and converting them to the elemental metal at the cathode.

---

This application is a continuation-in-part of our copending application Ser. No. 563,938, filed May 2, 1966, now Patent No. 3,404,036, which in turn is a continuation-in-part of application Ser. No. 458,596, filed May 25, 1965, and now abandoned.

This invention relates to an electrochemical method for separating a metal from a salt thereof. In particular, this invention relates to a method wherein a metal is separated from an electrically dissociable molten salt thereof by electrically dissociating the cations of said metal and said salt from the anions of said salt, passing said cations through a solid electrolyte that is selectively conductive to said cations and impermeable to said anions, and reducing said cations to elemental metal.

The accompanying drawing schematically illustrates the method of this invention. This method will be more fully understood from the illustrative examples that follow:

EXAMPLE 1

Referring now to the drawing, there is shown an electrolytic separation unit. The separation unit includes a first half-cell compartment 13 defined by metal container 15, e.g. Chromel, stainless steel, etc., insulators 17 and 19 and cationically-conductive, crystalline, solid electrolyte 21, and a second half-cell compartment 23 defined by metal container 25, which may be of the same or different corrosion resistant metal as container 15, insulators 17 and 19 and solid electrolyte 21. A molten salt 27, e.g. sodium sulfide, is introduced into compartment 13 via conduit 29. A first electrode 31, e.g. platinum, is in contact with the metal salt and in electrical connection via conductor 33 with a positive terminal of a D.C. power source 35. Compartment 23 contains molten sodium 37. A second electrode 39, e.g. platinum, is positioned within compartment 23 in contact with the molten sodium 37 and in electrical connection via conductor 41 with a negative terminal of D.C. power source 35. When a difference of potential is impressed between electrodes 31 and 39, sodium ions are separated from the sodium sulfide 27, passed through solid electrolyte 21, and converted into elemental sodium within compartment 23 upon accepting electrons from electrode 39. Sodium is removed from compartment 23 via conduit 43. Compartment 13 is provided with outlet conduit 45 through which sodium depleted salt may be removed.

Solid electrolyte 21 is a polycrystalline sheet formed by compressing and sintering cationically-conductive crystals. In a first embodiment, these crystals consist essentially of ions of aluminum and oxygen in crystal lattice combination and cations of the metal to be separated which migrate in relation to said crystal lattice under influence of an electric field. In a second embodiment, these crystals consist essentially of a multi-metal oxide comprising structural lattice and cations of the metal to be separated which can be passed through said crystal lattice by impressing a difference of electrical potential on opposite sides thereof. In this second embodiment, the structural lattice consists essentially of a major component of aluminum ions and oxygen ions and a minor component of ions of metal having a valence not greater than 2, preferably lithium, magnesium, or mixtures of lithium and magnesium. These solid electrolytes and their preparation are described in detail in the succeeding examples.

EXAMPLE 2

The solid electrolyte referred to in Example 1 is prepared in the following manner:

Powders of $Na_2CO_3$ and $Al_2O_3$ are mixed in such proportion as to provide a mixture equivalent to 60 wt. percent $NaAlO_2$ and 40 wt. percent $Na_2O \cdot 11\ Al_2O_3$. This mixture is heated to about 2900° F. (about 1593° C.) and forms a molten eutectic which when cooled to room temperature yields a product made up of particles of sodium beta-alumina imbedded in $NaAlO_2$. The $NaAlO_2$ is dissolved in water leaving the powdered sodium beta-alumina which is then ground and/or milled and sintered in the following manner: The powder is pressed into pellets at pressures of about 9,000 p.s.i. or greater. Pressures up to about 110,000 p.s.i. have been successfully employed. Sintering of the pellets is carried out in an enclosed platinum-rhodium crucible, in the presence of a coarse powder of beta-alumina at a temperature in the range of about 2900° F. to about 3300° F. (about 1593° C. to about 1816° C.) for a time in the range of about 5 minutes to about 1 hour. The composition of these crystals may be varied within limits. For instance, tests have shown that when the $Na_2O$ concentration is as low as 3.25 wt. percent or as high as 10 wt. percent these crystals exhibit ionic conductivity. The sodium oxide content is preferably maintained in the range of about 8 to about 12 mol percent. Slabs prepared in this manner were found to be impermeable to helium at 25° C., i.e. leakage of helium was not detectable by a standard laboratory leak detector (Consolidated Electrodynamics Corp. Leak Detector 24–120).

EXAMPLE 3

The solid electrolyte referred to in Example 1 is prepared in the following manner:

(1) All starting materials were dried prior to use.
(2) In powdered form $Na_2CO_3$, $LiNO_3$, and $Al_2O_3$ were added to a vessel and mechanically mixed for 30 minutes. The $Al_2O_3$ employed was in the form of 0.05 micron particles (Linde B).
(3) The mix was heated at 1250° C. for 1 hour.
(4) The sample was mixed with a wax binder (Carbowax) and mechanically pressed into pellets.
(5) The pellets were then isostatically pressed at 90,000 p.s.i.
(6) The wax binder was removed by slowly heating the pellets to about 550° C.
(7) The pellets were sintered in an electric furnace. During sintering, the pellets were kept in a covered crucible in the presence of packing powder of the same composition as said mix or, in some instances, of $$Na_2O \cdot Al_2O_3$$

(8) The pellets were weighed and physically measured.
(9) The electrical resistivities of the pellets were measured in the following manner:
(a) The flat opposing surfaces of the sample to be measured were first painted with a saturated solution of silver iodide in ethylenediamine. The pellet was then heated to 400° C. to remove the ethylenediamine, leaving the silver iodide as a smooth adherent layer. The silver iodide as a smooth adherent layer. The silver iodide was then covered with silver paint to insure good electrical contact. The resistance was measured at 300° C. using 1.5 mc. alternating current and the resistivity calculated.

The weight percent composition of $Li_2O$, $Na_2O$ and $Al_2O_3$ in these pellets prior to sintering, the sintering time and temperature, the density of the sintered pellets and their specific resistivity are set forth in the following table.

TABLE 1.—ELECTRICAL RESISTIVITIES OF POLYCRYSTALLINE MULTI-METAL OXIDES FROM $Li_2O$, $Na_2O$, AND $Al_2O$

| Batch identification No. | Wt. percent individual oxides used in preparation | | | Sintering conditions | | Density, g./c.c. | Specific resistivity, (ohm-cm.) 300° C., 1.5 megacycles |
|---|---|---|---|---|---|---|---|
| | $Li_2O$ | $Na_2O$ | $Al_2O_3$ | Time, hours | Temp., °C. | | |
| 5636T(a) | 0.99 | 9.99 | 89.02 | 16 | 1,440 | 2.86 | 7.17 |
| 5636T(b) | | | | 2 | 1,460 | 3.00 | 5.29 |
| 5636T(c) | | | | 2 | 1,460 | 2.95 | 6.2 |
| 5636T(d) | | | | 3 | 1,460 | 3.00 | 4.92 |
| 5636T(e) | | | | 3 | 1,460 | 3.02 | 5.81 |
| 5636T(f) | | | | 3 | 1,460 | 3.02 | ¹5.10 |
| 5636T(g) | | | | 3 | 1,460 | 3.00 | ¹3.73 |
| 5637T(a) | 1.14 | 9.98 | 88.88 | 16 | 1,440 | 2.92 | 5.32 |
| 5637T(b) | | | | 2 | 1,460 | 3.00 | 5.11 |
| 5637T(c) | | | | 2 | 1,460 | 3.01 | 4.83 |
| 5637T(d) | | | | 17 | 1,460 | 2.81 | 4.99 |
| 5637T(e) | | | | 16 | 1,480 | 2.72 | 6.64 |
| 5637T(f) | | | | 2 | 1,500 | 2.76 | 7.85 |
| 5647T(a) | 2.52 | 9.84 | 87.64 | 2 | 1,400 | 2.67 | 31.66 |
| 5647T(b) | | | | 16 | 1,440 | 2.65 | 17.32 |
| 5647T(c) | | | | 2 | 1,460 | 2.89 | 14.26 |
| 5647T(d) | | | | 2 | 1,500 | 2.41 | 43.7 |
| 5635T(a) | 0.83 | 10.00 | 89.17 | 16 | 1,440 | 2.86 | 10.53 |
| 5635T(b) | | | | 2 | 1,460 | 2.96 | 8.66 |
| 5635T(c) | | | | 2 | 1,500 | 3.05 | 4.88 |
| 5619T(a) | 0.66 | 10.02 | 89.32 | 16 | 1,520 | 2.96 | 4.36 |
| 5619T(b) | | | | 2 | 1,600 | 2.74 | 8.05 |
| 5629T(a) | 1.31 | 9.96 | 88.73 | 18 | 1,420 | 2.80 | 6.53 |
| 5629T(b) | | | | 16 | 1,460 | 2.95 | 3.78 |
| 5629T(c) | | | | 16 | 1,480 | 2.70 | 8.69 |
| 5629T(d) | | | | 4 | 1,500 | 2.70 | 7.48 |
| 5629T(e) | | | | 16 | 1,520 | 2.54 | 8.59 |
| 5629T(f) | | | | 2 | 1,600 | 2.56 | 11.78 |
| 5633T(a) | 1.31 | 10.48 | 88.21 | 18 | 1,420 | 2.78 | 9.19 |
| 5633T(b) | | | | 3 | 1,460 | 2.90 | 6.66 |
| 5633T(c) | | | | 16 | 1,460 | 2.91 | 5.66 |
| 5633T(d) | | | | 4 | 1,500 | 2.72 | 7.43 |
| 5633T(e) | | | | 16 | 1,520 | 2.59 | 7.12 |
| 5633T(f) | | | | 2 | 1,600 | 2.54 | 10.83 |
| 5648T(a) | 3.97 | 9.71 | 86.32 | 16 | 1,440 | 2.51 | 19.6 |
| 5648T(b) | | | | 2 | 1,460 | 2.81 | 37.81 |
| 5648T(c) | | | | 2 | 1,500 | 2.46 | 31.4 |
| 5653T(a) | 0.16 | 10.08 | 89.76 | 3 | 1,460 | 2.86 | 17.2 |
| 5653T(b) | | | | 17 | 1,460 | 2.88 | 12.8 |
| 5654T | 0.33 | 10.05 | 89.62 | 3 | 1,460 | 2.84 | 12.4 |
| 5655T | 0.49 | 10.04 | 89.47 | 3 | 1,460 | 2.86 | 12.7 |

¹ After pellet had been immersed in sodium at 800° C. for one week.

EXAMPLE 4

The solid electrolyte referred to in Example 1 is prepared as in Example 3 except that MgO is substituted for $Li_2O$ (From $LiNO_3$). Data corresponding to that compiled for the pellets of Example 3 is set forth in the following table:

TABLE 2.—ELECTRICAL RESISTIVITIES OF POLYCRYSTALLINE MULTI-METAL OXIDES FROM MgO, $Na_2O$ AND $Al_2O_3$

| Batch identification No. | Wt. percent individual oxides used in preparation | | | Sintering conditions | | Density, g./cc. | Specific resistivity (ohm-cm.) 300° C., 1.5 megacycles |
|---|---|---|---|---|---|---|---|
| | MgO | $Na_2O$ | $Al_2O_3$ | Time, hours | Temp., °C. | | |
| 662T(a) | 2.5 | 9.0 | 88.5 | 17 | 1,540 | 3.08 | 3.28 |
| 662T(b) | | | | 17 | 1,580 | 3.12 | 3.97 |
| 662T(c) | | | | 17 | 1,580 | 3.16 | 4.12 |
| 5680T(a) | 3.92 | 9.75 | 88.33 | 4 | 1,460 | 2.75 | 25.2 |
| 5680T(b) | | | | 17 | 1,500 | 2.93 | 6.68 |
| 5680T(c) | | | | 3 | 1,560 | 2.97 | 7.82 |
| 5680T(d) | | | | 17 | 1,580 | 2.93 | 4.98 |
| 5686T(a) | 5.00 | 9.75 | 85.25 | 17 | 1,480 | 2.89 | 18.20 |
| 5686T(b) | | | | 16 | 1,520 | 2.94 | 5.70 |
| 5686T(c) | | | | 2 | 1,560 | 2.91 | 6.10 |
| 5686T(d) | | | | 17 | 1,560 | 2.86 | 13.11 |
| 5688T(a) | 3.00 | 9.75 | 87.25 | 17 | 1,480 | 2.92 | 7.48 |
| 5686T(b) | | | | 17 | 1,520 | 2.96 | 9.36 |
| 5688T(c) | | | | 17 | 1,560 | 2.81 | 14.28 |
| 5686T(d) | | | | 3 | 1,600 | 2.89 | 9.12 |
| 5688T(e) | | | | 4 | 1,625 | 2.57 | 19.49 |
| 5691T(a) | 7.00 | 9.75 | 83.25 | 16 | 1,480 | 1.85 | 99.19 |
| 5691T(b) | | | | 3 | 1,520 | 2.73 | 9.52 |
| 5691T(c) | | | | 17 | 1,560 | 2.83 | 6.73 |
| 5691T(d) | | | | 4 | 1,600 | 2.88 | 12.51 |
| 5691T(e) | | | | 16 | 1,600 | 2.83 | 4.57 |
| 5691T(f) | | | | 4 | 1,625 | 2.76 | 14.36 |

TABLE 2—Continued

| Batch identification No. | Wt. percent individual oxides used in preparation | | | Sintering conditions | | Density, g./cc. | Specific resistivity (ohm-cm) 300° C., 1.5 megacycles |
|---|---|---|---|---|---|---|---|
| | MgO | Na₂O | Al₂O₃ | Time, hours | Temp., °C. | | |
| 5687T(a) | 2.00 | 9.75 | 88.25 | 17 | 1,480 | 2.77 | 10.66 |
| 5687T(b) | | | | 17 | 1,520 | 3.00 | 10.65 |
| 5687T(c) | | | | 17 | 1,560 | 2.66 | 13.16 |
| 5687T(d) | | | | 3 | 1,600 | 2.83 | 13.42 |
| 5687T(e) | | | | 4 | 1,625 | 2.49 | 29.08 |
| 5685T(a) | 1.00 | 9.75 | 89.25 | 17 | 1,480 | 2.87 | 18.38 |
| 5685T(b) | | | | 16 | 1,520 | 2.98 | 16.6 |
| 5685T(c) | | | | 2 | 1,560 | 2.84 | 13.88 |
| 5685T(d) | | | | 17 | 1,560 | 2.90 | 18.85 |
| 5692T(a) | 9.00 | 9.75 | 81.25 | 16 | 1,480 | 1.81 | 122.36 |
| 5692T(b) | | | | 3 | 1,520 | 2.63 | 19.94 |
| 5692T(c) | | | | 17 | 1,560 | 2.75 | 15.81 |
| 5692T(d) | | | | 16 | 1,600 | 2.58 | 17.45 |
| 5692T(e) | | | | 4 | 1,625 | 2.48 | 25.17 |
| 56127T(a) | 11.0 | 9.75 | 79.25 | 4 | 1,540 | 2.69 | 37.04 |
| 56127T(b) | | | | 4 | 1,580 | 2.84 | 21.81 |
| 56127T(c) | | | | 4 | 1,625 | 2.71 | 76.32 |
| 56128T(a) | 13.00 | 9.75 | 77.25 | 16 | 1,550 | 2.54 | 79.00 |
| 56128T(b) | | | | 4 | 1,550 | 2.76 | 45.2 |
| 56128T(c) | | | | 2 | 1,650 | 2.68 | 191.00 |
| 56129T(a) | 15.00 | 9.75 | 75.25 | 16 | 1,550 | 2.52 | 201.00 |
| 56129T(b) | | | | 4 | 1,600 | 2.39 | 60.3 |

EXAMPLE 5

The solid electrolyte referred to in Example 1 is prepared as in Example 3 except that MgO and Li₂O (introduced as LiNO₃) were used in conjunction with Na₂O (introduced as Na₂CO₃) and Al₂O₃. Data corresponding to that compiled for the pellets of the preceding examples is set forth in the following table:

TABLE 3.—ELECTRICAL RESISTIVITIES OF POLYCRYSTALLINE MULTI-METAL OXIDES FROM Li₂O, MgO, Na₂O AND Al₂O₃

| | Wt. percent individual oxides used in preparation | | | | Sintering conditions | | Density, g./cc. | Specific resistivity (ohm-cm.) 300° C., 1.5 megacycles |
|---|---|---|---|---|---|---|---|---|
| | Li₂O | MgO | Na₂O | Al₂O₃ | Time, hours | Temp., °C. | | |
| Batch identification No: | | | | | | | | |
| 5616T (a) | 0.32 | 1.32 | 9.95 | 88.41 | 16 | 1,520 | 2.92 | 8.6 |
| 5616T (b) | | | | | 16 | 1,520 | 2.80 | 11.6 |
| 5616T (c) | | | | | 5 | 1,580 | 2.93 | 13.4 |
| 5618T (a) | 0.49 | 0.70 | 9.99 | 88.82 | 16 | 1,400 | 2.87 | 10.2 |
| 5618T (b) | | | | | 3 | 1,520 | 2.84 | 13.9 |
| 5618T (c) | | | | | 16 | 1,520 | 3.07 | 5.58 |
| 5618T (d) | | | | | 7 | 1,560 | 2.85 | 7.8 |
| 5618T (e) | | | | | 2 | 1,600 | 2.66 | 13.0 |
| 5618 (s) T (a) | 0.49 | 9.87 | 9.97 | 88.67 | 2.25 | 1,520 | 2.50 | ¹ 19.9 |
| 5615T (a) | 0.65 | 1.34 | 10.01 | 88.00 | 17 | 1,500 | 2.87 | 24.5 |
| 5615T (b) | | | | | 15.5 | 1,520 | 2.74 | 6.57 |
| 5615T (c) | | | | | 17 | 1,520 | 2.99 | 5.27 |

¹ After being immersed in sodium at 800° C. for one week.

EXAMPLE 6

The solid electrolyte referred to in Example 1 is prepared in the following manner:

(1) Magnesium oxide is prepared by calcining basic magnesium carbonate at a temperature of about 816° C.

(2) The magnesium oxide is mixed with finely divided (Linde B) Al₂O₃ as a benzene slurry.

(3) The benzene is removed by evaporation.

(4) The magnesium oxide-alumina mixture is then fired at about 1427° C. for about 30 minutes.

(5) The product of 4 is mixed with sodium carbonate as a benzene slurry.

(6) The benzene is removed by evaporation.

(7) The magnesium oxide-alumina-sodium carbonate mixture is then fired at about 1427° C. for about 30 minutes.

(8) The powder product of 7 the particles of which are less than about 1, preferably not significantly greater than ⅓, micron, is then admixed with a conventional wax lubricant (Carbowax) and pressed into cylinders hydrostatically at 100,000 p.s.i.

(9) The wax lubricant is removed by heating the cylinders in air raising the temperature over a two-hour period to about 600° C. and maintaining such temperature for an additional hour.

(10) The cylinders are then sintered by packing the cylinders in MgO crucibles with packing powder of the same composition, i.e. the powder product of 7, and heating at 1900° C. in air for 15 minutes.

The composition of these cylinders is determined to be 6.3 wt. percent Na₂O, 2.18 wt. percent MgO and 91.52 wt. percent Al₂O₃. The composition is determined by conventional chemical analysis, i.e. sodium by flame photometry, magnesium by titration using eriochrome black T as the indicator, and aluminum by difference.

Other electrolytes are prepared by this technique except that NiO, ZnO, and CoO are employed in lieu of MgO and different sintering temperatures are used. The composition of each batch of these materials is determined by chemical analysis after the last step prior to sintering. This composition, the electrical resistance and weight of the individual cylinders, and the sintering temperatures used for the respective batches are set forth in the following table:

TABLE 4.—ELECTRICAL RESISTIVITIES OF $Na_2O$-$NiO$-$Al_2O_3$, $Na_2O$-$ZnO$-$Al_2O_3$, AND $Na_2O$-$CoO$-$Al_2O_3$ CYLINDERS

| Batch identification number | Wt. percent batch composition | Cylinder No. | Electrical resistivity, ohm-cm. | Wt. of cylinder, gms. | Sintering temperature, C.° |
|---|---|---|---|---|---|
| 95-2 | $Na_2O$, 8.65; $NiO$, 6.66; $Al_2O_3$, 84.69 | 1 | 1,665 | 3.18 | 1,800 |
|  |  | 2 | 1,850 | 3.14 | 1,800 |
| 113 | $Na_2O$, 8.65; $NiO$, 6.66; $Al_2O_3$, 84.69 | 1 | 1,070 | 2.89 | 1,900 |
|  |  | 2 | 1,700 | 2.90 | 1,900 |
|  |  | 3 | 995 | 2.93 | 1,900 |
| 95-1 | $Na_2O$, 8.70; $ZnO$, 5.86; $Al_2O_3$, 85.44 | 1 | 1,370 | 3.12 | 1,800 |
|  |  | 2 | 2,350 | 3.02 | 1,800 |
| 95 | $Na_2O$, 8.64; $CoO$, 6.67; $Al_2O_3$, 84.69 | 1 | 1,035 | 3.21 | 1,800 |
|  |  | 2 | 945 | 3.20 | 1,800 |

EXAMPLE 7

The solid electrolyte referred to in Example 1 is prepared in the following manner:

A mixture containing 9.75 wt. percent $Na_2O$ as $Na_2CO_3$, 3.92 wt. percent $MgO$, and 86.33 wt. percent $Al_2O_3$ is shaken mechanically for 30 minutes, heated at 1250° C. for 1 hour, mixed with wax, then mechanically pressed into pellets. The pellets are isostatically pressed at 90,000 p.s.i. after which the binder is removed by slow heating to 550° C. The pellets are then sintered in an electric furnace, i.e. heated at about 1550° C. During sintering, the samples are kept in a covered crucible with

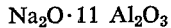

$$Na_2O \cdot 11\ Al_2O_3$$

A sample pellet is placed in a clean crucible. This is placed open on a bed of dry $K_2O \cdot Al_2O_3$ in a larger crucible. The larger crucible is covered and heated to 1380° C. for 64 hours to expose the sample to $K_2O$ vapor resulting from slow decomposition of the $K_2O \cdot Al_2O_3$. After cooling, the sample is washed in water and dried.

The electrical resistivity of the sample is measured and found to be about 22.1 ohm-cm. at 300° C.

Elemental analysis of the sample revealed that about 1.14 wt. percent thereof was derived from $Na_2O$ and about 11.80 wt. percent from $K_2O$.

Another of the pellets is placed in an open clean crucible. This crucbile is placed on a bed of dry $KCl$ in a larger platinum crucible. The larger crucible is covered and heated at 1100° C. for 3 hours. This pellet was then placed in molten $KNO_3$ at 400° C. for 16 hours and then reheated in $KCl$ vapor at 1100° C. for 3 hours. The sample was washed with cold water and dried. This sample had a density of 2.75 and an electrical resistivity at 300° C. of about 8.26 ohm-cm. Elemental analysis of this sample revealed that about 0.66 wt. percent thereof was derived from $Na_2O$ and about 12.76 wt. percent from $K_2O$. This electrolyte is employed for the separation of potassium from an electrically dissociable salt thereof.

Another of the pellets is converted to a lithium ion-conducting ceramic by immersing the pellet overnight in liquid silver nitrate under an argon blanket and then immersing the resultant pellet overnight in liquid lithium chloride under an argon blanket.

EXAMPLE 8

Using a cell such as that shown in FIGURE 1, a molten $NaNO_3$–$NaNO_2$ eutectic mixture at 245° C. is placed in the compartment corresponding to compartment 13 of FIGURE 1. A small amount of molten sodium is placed in the compartment corresponding to compartment 23 of FIGURE 1. A difference of electrical potential is provided between the electrodes to cause sodium ions to dissociate from said mixture, pass through the solid electrolyte and convert to elemental sodium upon accepting electrons from electrode 39 in compartment 23, i.e. a voltage sufficient to make electrode 39 more negative than the open circuit voltage of the cell, e.g. ordinarily above about 2 volts.

It is to be understood that this invention is not limited to the examples herein shown and described, but that changes and modifications may be made without departing from the spirit and scope of the invention, as defined in the appended claims.

We claim:
1. An electrochemical method for recovering a metal from an electrically dissociable salt thereof which comprises placing said salt in molten state in contact with one side of a solid electrolyte that is impermeable to said metal, said salt and the anions of said salt and selectively conductive with respect to the cations of said metal and said salt, providing a first electrode in contact with said salt on one side of said solid electrolyte, providing a second electrode in contact with said metal on the opposite side of said electrolyte, providing a difference of electrical potential between said first electrode and said second electrode in polarity arrangement adapted to cause unidirectional flow of cations of said metal from said salt through said solid electrolyte and convert said cation to elemental metal, said solid electrolyte consisting of a crystalline structure consisting of a crystal lattic and cations of said metal which migrate in relation to said crystal lattice under influence of an electric field, at least a major proportion by weight of said crystal lattice consisting of ions of aluminum and oxygen in crystal lattice combination.

2. The method of claim 1 wherein said crystal lattice consists essentially of ions of aluminum and oxygen in crystal lattice combination.

3. The method of claim 1 wherein said crystal lattice consists essentially of a major proportion by weight of ions of aluminum and oxygen and a minor proportion by weight of ions of a metal having a valence not greater than 2.

4. The method of claim 1 wherein said metal is an alkali metal.

5. An electrochemical method for separating an alkali metal from a molten salt thereof, the anions of which are electrochemically reversibly reactive with cations of said metal, which comprises bringing said molten salt into contact with a solid electrolyte that is impermeable to said metal, said salt and said anions and selectively conductive with respect to the cations of said metal and said salt, providing a first electrode in contact with said salt on one side of said solid electrolyte, providing a second electrode in contact with said metal on the opposite side of said electrolyte, providing a difference of electrical potential between said first electrode and said second electrode to cause unidirectional flow of cations of said metal from said salt through said solid electrolyte and convert said cations to elemental metal, said solid electrolyte consisting of a crystalline structure consisting of a crystal lattice and cations of said metal which migrate in relation to said crystal lattice under influence of an electric field, at least a major proportion by weight of said crystal lattice consisting of ions of aluminum and oxygen in crystal lattice combination.

6. The method of claim 5 wherein said metal is sodium and said solid electrolyte is not crystallographically distinguishable from sodium beta-alumina.

(References on following page)

References Cited

UNITED STATES PATENTS

| | | | |
|---|---|---|---|
| 745,958 | 12/1903 | Ewan | 204—68 |
| 3,017,335 | 1/1962 | Wolfe | 204—62 |

OTHER REFERENCES

Amphlett, "Inorganic Ion Exchangers," 1964, QD 561 A5, p. 85.

Helfferich, "Ion Exchange," 1962, McGraw-Hill, pp. 10 and 11.

JOHN H. MACK, Primary Examiner

A. C. PRESCOTT, Assistant Examiner

U.S. Cl. X.R.

204—60, 68, 243, 301